US012463328B2

(12) United States Patent
Park et al.

(10) Patent No.: US 12,463,328 B2
(45) Date of Patent: Nov. 4, 2025

(54) BASE STATION ANTENNA DEVICE AND ADAPTER THEREOF

(71) Applicant: KMW INC., Hwaseong-si (KR)

(72) Inventors: Dae Myung Park, Hwaseong-si (KR); In Ho Kim, Yongin-si (KR); Hyoung Seok Yang, Hwaseong-si (KR); Seong Man Kang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 460 days.

(21) Appl. No.: 17/860,111

(22) Filed: Jul. 8, 2022

(65) Prior Publication Data

US 2022/0344798 A1 Oct. 27, 2022

Related U.S. Application Data

(63) Continuation of application No. PCT/KR2021/000231, filed on Jan. 8, 2021.

(30) Foreign Application Priority Data

Jan. 9, 2020 (KR) ........................ 10-2020-0003287
Jan. 8, 2021 (KR) ........................ 10-2021-0002329

(51) Int. Cl.
*H01Q 1/24* (2006.01)
*H01Q 1/12* (2006.01)

(52) U.S. Cl.
CPC ........... *H01Q 1/246* (2013.01); *H01Q 1/1228* (2013.01); *H01Q 1/125* (2013.01)

(58) Field of Classification Search
CPC ...... H01Q 1/12; H01Q 1/1207; H01Q 1/1228; H01Q 1/1242; H01Q 1/125; H01Q 1/1264;
(Continued)

(56) References Cited

U.S. PATENT DOCUMENTS

2014/0179244 A1 6/2014 Colapietro et al.
2016/0352042 A1 12/2016 Wankoff et al.
(Continued)

FOREIGN PATENT DOCUMENTS

CN 201233948 Y 5/2009
CN 106207624 A 12/2016
(Continued)

OTHER PUBLICATIONS

Indian office action mailed Dec. 9, 2022 from the Indian Patent Office for Japanese Application No. 202217040595.
(Continued)

*Primary Examiner* — Robert Karacsony
(74) *Attorney, Agent, or Firm* — Insight Law Group, PLLC; Seung Lee

(57) ABSTRACT

A base station antenna device includes an antenna module having a separation space spaced a predetermined distance forward from a support pole, a remote radio head (RRH) provided on the rear surface of the antenna module such that the RRH is slidably assembled in a detachable manner in a horizontal direction from a lateral side of the separation space, and an adapter having a push block provided on a lower end portion of the RRH so as to mediate the electrical signal connection and disconnection between the antenna module and the RRH by means of a pushing operation in the longitudinal direction.

12 Claims, 10 Drawing Sheets

(58) Field of Classification Search
CPC ...... H01Q 1/246; H01Q 1/50; H01Q 3/02–10; H01Q 23/00
See application file for complete search history.

(56) References Cited

U.S. PATENT DOCUMENTS

| | | | | |
|---|---|---|---|---|
| 2016/0365618 | A1 | 12/2016 | Kim et al. | |
| 2017/0237160 | A1* | 8/2017 | Kim | H01Q 13/08 343/745 |

FOREIGN PATENT DOCUMENTS

| | | | |
|---|---|---|---|
| CN | 107210526 | A | 9/2017 |
| CN | 209461627 | U | 10/2019 |
| JP | 2001-292015 | A | 10/2001 |
| JP | 2011-078053 | A | 4/2011 |
| JP | 2017-537535 | A | 11/2021 |
| JP | 7082708 | B | 6/2022 |
| JP | 2023-508961 | A | 3/2023 |
| KR | 20-2011-0001415 | U | 2/2011 |
| KR | 10-2014-0127604 | A | 11/2014 |
| KR | 10-2015-0100103 | A | 9/2015 |
| KR | 10-2016-0052311 | A | 5/2016 |
| KR | 10-2016-0052311 | A1 | 5/2016 |
| KR | 10-2016-0084707 | A | 7/2016 |
| WO | 2015/105351 | A1 | 7/2015 |

OTHER PUBLICATIONS

Non-final Office Action mailed on Aug. 15, 2023 from the Japanese Patent Office for Japanese Application No. 2022-541970.
Extended European Search Report mailed on Jan. 3, 2024 from the European Patent Office for European Application No. 21738427.0.
Non-final Office Action mailed on Jan. 23, 2024 from the Japanese Patent Office for Japanese Application No. 2022-541970.
Non-final office action mailed May 14, 2022 for Korean Application No. 10-2021-0002329.
International Search Report mailed Apr. 16, 2021 for International Application No. PCT/KR2021/000231 and its English translation.
Office Action mailed on Apr. 17, 2025 from Chinese Patent Office for Application No. 202180008583.0.

* cited by examiner

BASE STATION ANTENNA DEVICE AND ADAPTER THEREOF

CROSS-REFERENCE TO RELATED APPLICATIONS

This application is a Continuation of International Application No. PCT/KR2021/000231, filed on Jan. 8, 2021, which claims the benefit of and priority to Korean Patent Application Nos. 10-2020-0003287, filed on Jan. 9, 2020; and 10-2021-0002329, filed on Jan. 8, 2021, the disclosure of which are herein incorporated by reference in their entirety.

TECHNICAL FIELD

The present disclosure relates to a base station antenna device and an adapter thereof, and more particularly, to a base station antenna device with easy assembly and installation, and an adapter thereof.

BACKGROUND ART

In a mobile communication system, a 'base station' refers to a system that relays radio waves of a mobile terminal in a cell. The base station is installed mainly on the roof of a building to relay the radio waves of the mobile terminal. Therefore, base stations exist in a unit of cell, and these base stations control, in addition to the interface function between the mobile terminal and the switching center, transmission of incoming and outgoing signals, designation of call channels, and monitoring of call channels, etc. in a unit of cell. As an antenna device employed in a base station, a control antenna capable of vertically or horizontally tilting a beam has been popularized with many advantages.

As mobile communication services become more popular, the distribution of antenna devices that provide a wireless network environment that can provide services more stably is expanding, and mobile communication services have recently evolved into 5G from 2G ($2^{nd}$ Generation), which only enabled wired calls, through 3G, 4G, and pre-5G. The antenna device for such 5G mobile communication can share the installation location with those of the existing 4G and pre-5G.

However, in the conventional base station antenna device, since the specifications of the antenna module and the remote radio head (RRH) are different, a problem arises in that it is very difficult to connect and assemble the antenna for each frequency band provided to the antenna module and the RRH, and installation time and cost increase greatly.

DISCLOSURE

Technical Problem

Accordingly, the present disclosure has been made keeping in mind the above problems occurring in the related art, and an objective of the present disclosure is to provide a base station antenna device capable of: minimizing the number of parts used to install an antenna module and a remote radio head (RRH) on a support pole while promoting the common use of the parts; minimizing the installation time and cost of the base station antenna device; and providing convenience in maintenance and repair, and an adapter thereof.

In addition, another objective of the present disclosure is to provide a base station antenna device capable of greatly shortening the coupling time by adopting a sliding coupling structure as well as minimizing bolting coupling in the installation of the RRH on the rear surface of the antenna module, and an adapter thereof.

Further, a further objective of the present disclosure is to provide a base station antenna device, which is very easy to operate by designing a push-type signal-connection/disconnection between the antenna module and the RRH, and an adapter thereof.

The objectives of the present disclosure are not limited to the aforementioned description, and other objectives not explicitly disclosed herein will be clearly understood by a person having ordinary skill in the art from the description provided hereinafter.

Technical Solution

An embodiment of the present disclosure provides a base station antenna device including: an antenna module vertically provided to have a separation space spaced a predetermined distance forward with respect to a support pole so as to be tiltable at a predetermined angle; a remote radio head (RRH) provided on the rear surface of the antenna module so as to be positioned in the separation space such that the RRH is slidably assembled in a detachable manner in a horizontal direction from a lateral side of the separation space, and an adapter having a push block provided on a lower end portion of the RRH so as to mediate the electrical signal connection and disconnection between the antenna module and the RRH by means of a pushing operation in the longitudinal direction.

Here, at least one sliding assembly rail may be arranged, extending lengthways in the horizontal direction, on the rear surface of the antenna module, and at least one sliding block may be arranged on a front surface of the RRH opposite to the rear surface of the antenna module so as to be slidably assembled onto the at least one sliding assembly rail in a detachable manner.

In addition, the sliding block may be provided in the shape of a wheel with a concave sliding groove formed on an outer circumferential surface thereof, wherein a guide rod extending lengthways in the horizontal direction in the sliding assembly rail is inserted into and coupled to the sliding groove.

In addition, at least one fixing bracket may be provided on a lateral side of the antenna module so as to protrude from the left end and right end of the at least one sliding assembly rail, and the left or right fixing bracket may be detachably assembled onto the lateral side of the antenna module.

In addition, the at least one fixing bracket may include a fixing block coupled to the antenna module, and a pivot block provided pivotally with respect to the fixing block and detachably fixed to the left or right side of the RRH.

In addition, an upper end of the antenna module may be connected to a tilting unit, which is connected to the support pole and provided to extend a predetermined length in the horizontal direction, so as to be tiltable in the front and rear directions on the basis of a fixed tilting point of a lower end of the antenna module.

In addition, the separation space may be changed by a tilting operation of the antenna module tilted by the tilting unit.

In addition, a plurality of adapters may be provided at the lower end of the RRH so as to be spaced apart a predetermined distance in the horizontal direction.

In addition, the antenna module may be provided with a fixed connector connected to the push block.

In addition, the push block may include a locking connector to allow for electrical connection and physical locking-connection with the fixed connector by the pushing movement toward the antenna module and for electrical disconnection and physical locking-disconnection from the fixed connector by the pulling movement opposite to the antenna module.

In addition, the locking connector may be positioned at a pulling position to release the interference with the fixed connector before the sliding coupling of the RRH with respect to the rear surface of the antenna module, and at a push position to surround the fixed connector after the sliding coupling of the RRH with respect to the rear surface of the antenna module.

In addition, the push block may include a guide housing having a space opened in a direction of the pushing movement and pulling movement, a moving block provided to move along the guide housing, and the locking connector connected to an end of moving block.

An embodiment of the present disclosure provides an adapter of the base station antenna device, the adapter including a locking connector provided at the lower end of the RRH to enable pushing movement and pulling movement to allow for electrical connection and physical locking-connection with the fixed connector provided at the lower end of the antenna module, a moving block having an end, to which the locking connector is connected, and being pushed and pulled according to the user's external force, and a guide housing provided to guide the pushing movement and pulling movement of the moving block.

Here, the locking connector may be positioned at a pulling position to release the interference with the fixed connector before the sliding coupling of the RRH with respect to the rear surface of the antenna module, and at a push position to surround the fixed connector after the sliding coupling of the RRH with respect to the rear surface of the antenna module.

Advantageous Effects

According to the base station antenna device and the adapter thereof of the present disclosure, the following various effects can be achieved.

First, the present disclosure has the effect of minimizing the installation time and cost of the antenna module and the RRH.

Second, the electrical connection and physical locking between the antenna module and the RRH within the restricted installation space are achieved by a simple pushing/pulling operation, thereby providing the effect of improving field workability.

DESCRIPTION OF REFERENCE SIGNS

Figure 1:
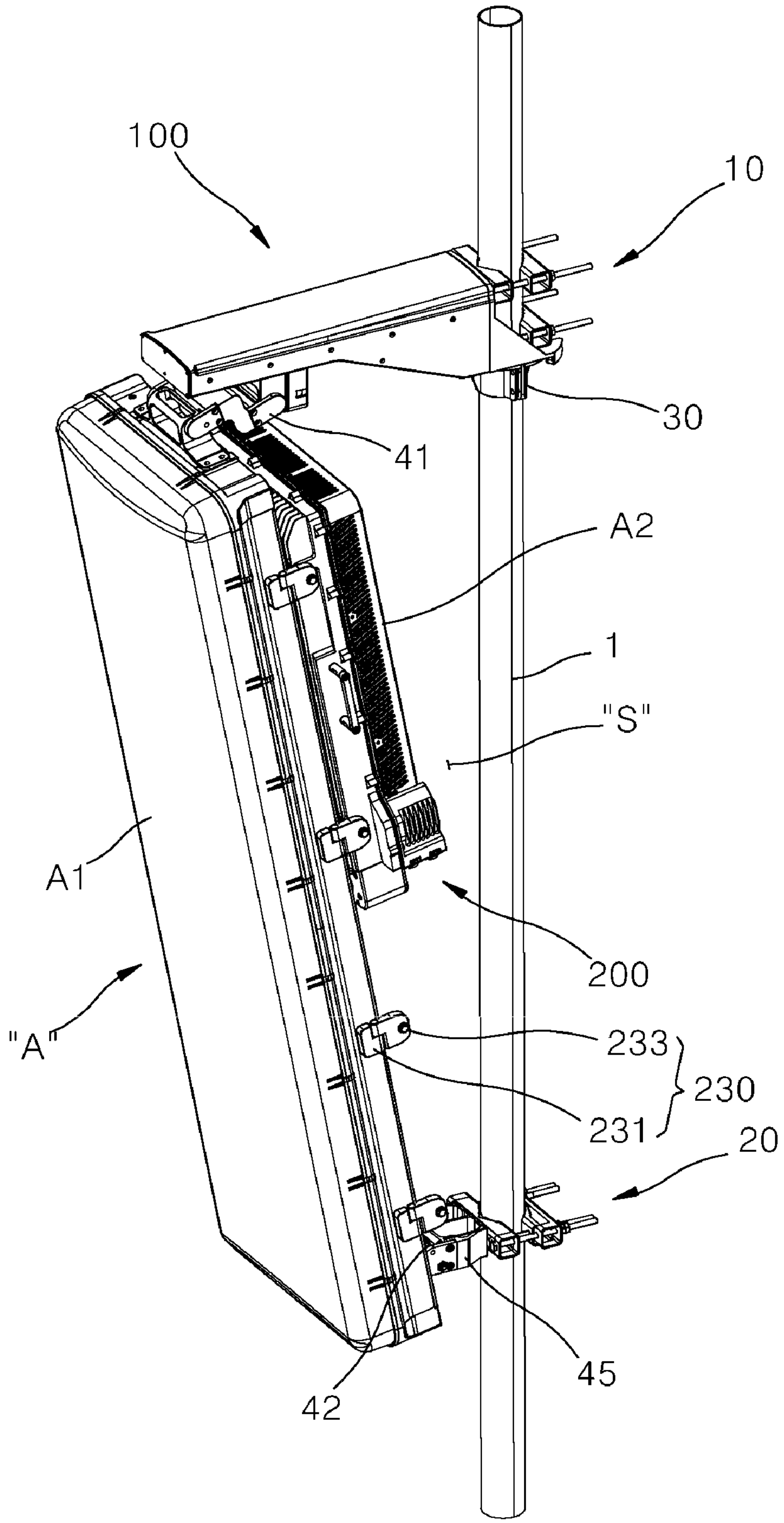
FIG. 1 is a front perspective view illustrating a base station antenna device according to the present disclosure.

| | |
|---|---|
| A1: Antenna module | A2: RRH |
| 1: Support pole | 10: Upper coupling clamp |
| 11a, 11b: Upper clamp block on one side | |
| 12a, 12b: Upper clamp block on the other side | |
| 13: Upper fixing bolt | 14: Upper fixing nut |
| 20: Lower coupling clamp | 21: Lower clamp block on one side |
| 22: Lower clamp block on the other side | |
| 23: Two or more fixing bolts | |
| 24: Two or more fixing nuts | 30: Seating clamp |
| 41: Upper hinge link | |
| 42: Lower hinge link | |
| 45: Pivot bracket | 100: Tilting unit |
| 230: Fixing bracket | 231: Fixing block |
| 233: Pivot block | 200: Adapter |
| 211: Push knob | 212: Push indicator |
| 213: Guide housing | 217: Fixed connector |
| 218: Locking connector | S: Separation space |

MODE FOR INVENTION

Hereinafter, an embodiment of a base station antenna device and an adapter thereof according to the present disclosure will be described in detail with reference to the accompanying drawings.

It is noted that when designating reference signs to elements in the drawings, like elements may be designated with like reference signs although the elements are shown in different drawings. Further, in the following description of embodiments of the present disclosure, detailed descriptions of well-known components and functions incorporated herein will be omitted when it is determined that the description may make the subject matter in some embodiments of the present disclosure rather unclear.

Terms, such as "first", "second", "A", "B", "(a)", or "(b)" may be used to describe elements of embodiments of the present disclosure. Each of these terms is not used to define the essence, order, sequence, etc. of the corresponding element, but is used merely to distinguish the corresponding element from other elements. Unless otherwise defined, all terms used herein including technological or scientific terms have the same meanings as those generally understood by those skilled in the art. Terms defined in generally used dictionary shall be construed that they have meanings matching those in the context of the related art, and shall not be construed in ideal or excessively formal meanings unless they are clearly defined in the present application.

Figure 2:
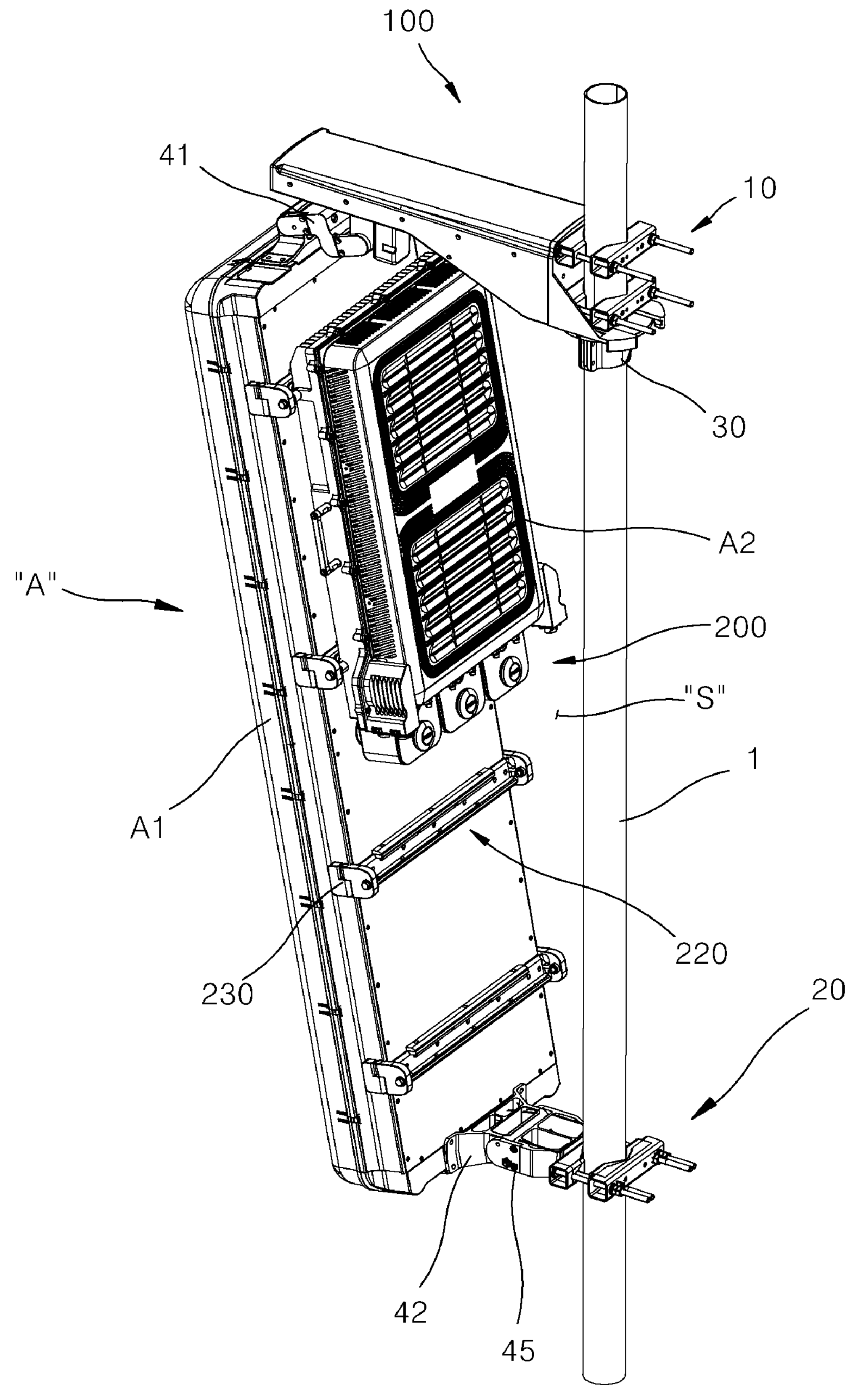
FIG. 2 is a rear perspective view illustrating the base station antenna device according to the present disclosure.
Figure 3:
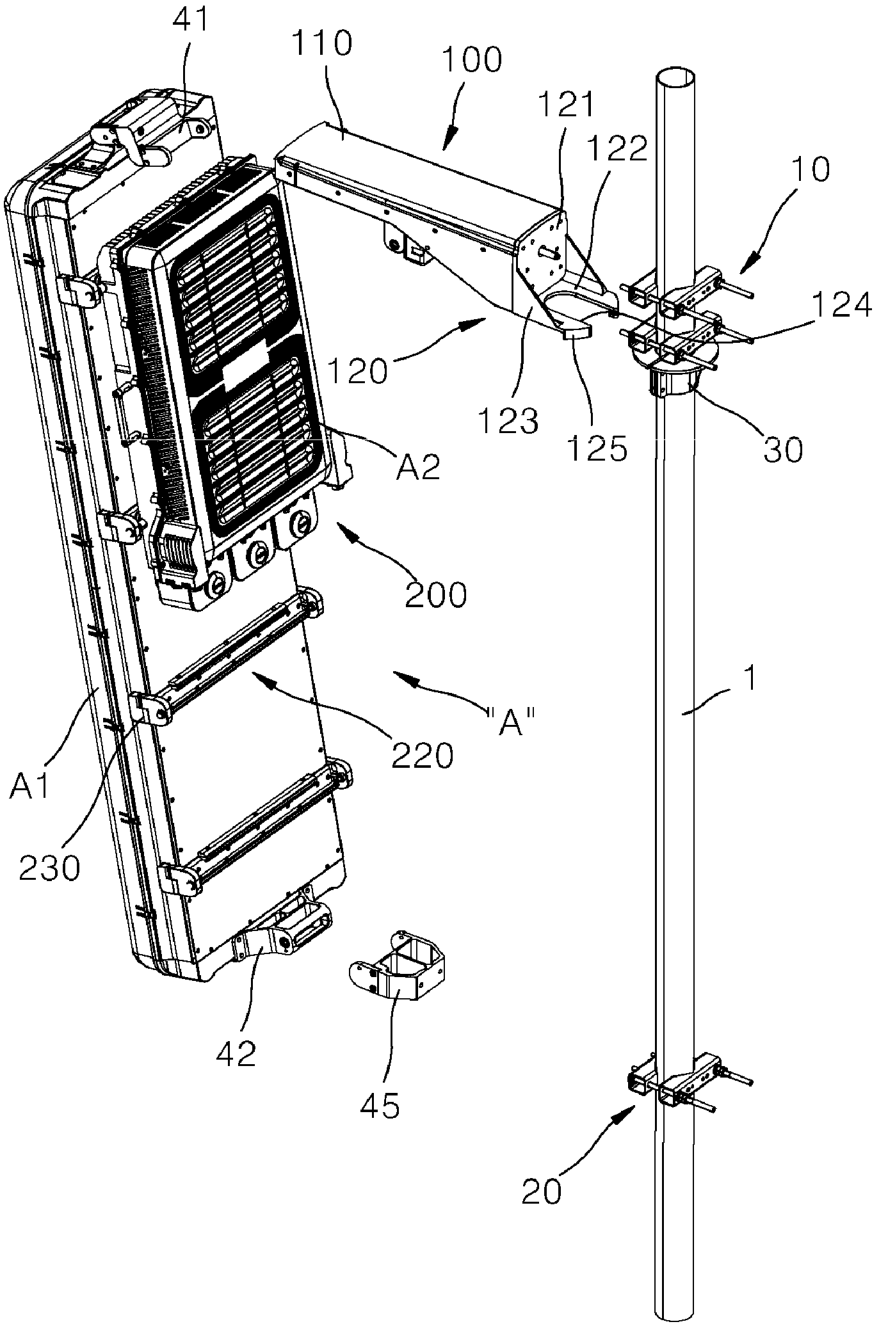
FIG. 3 is an exploded perspective view of FIG. 2.
Figure 4:
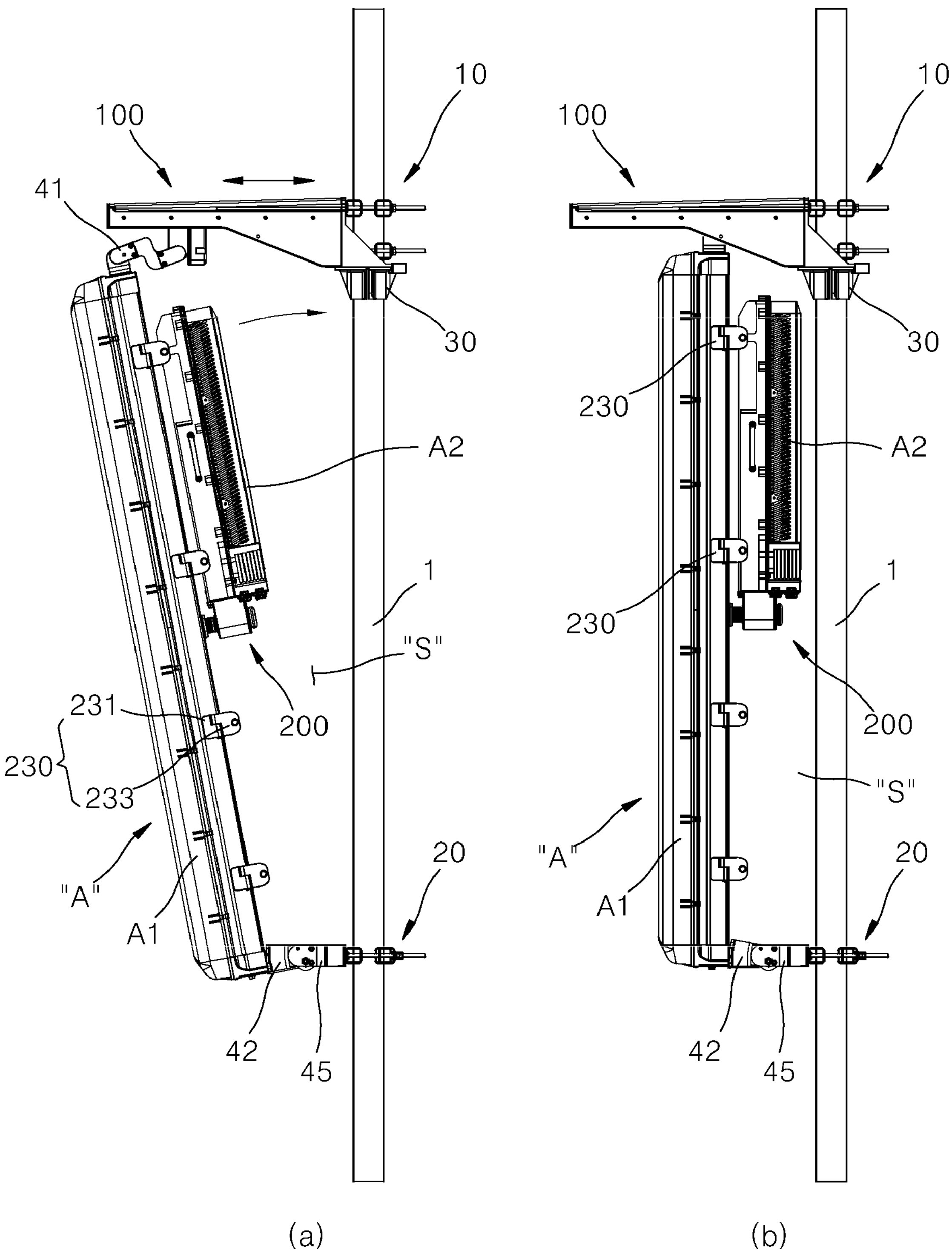
FIG. 4 is a side view illustrating a state before and after tilting of the base station antenna device according to the present disclosure.

FIG. 1 is a front perspective view illustrating a base station antenna device according to the present disclosure, FIG. 2 is a rear perspective view illustrating the base station antenna device according to the present disclosure, FIG. 3 is an exploded perspective view of FIG. 2, and FIG. 4 is a side view illustrating a state before and after tilting of the base station antenna device according to the present disclosure.

Figure 5:
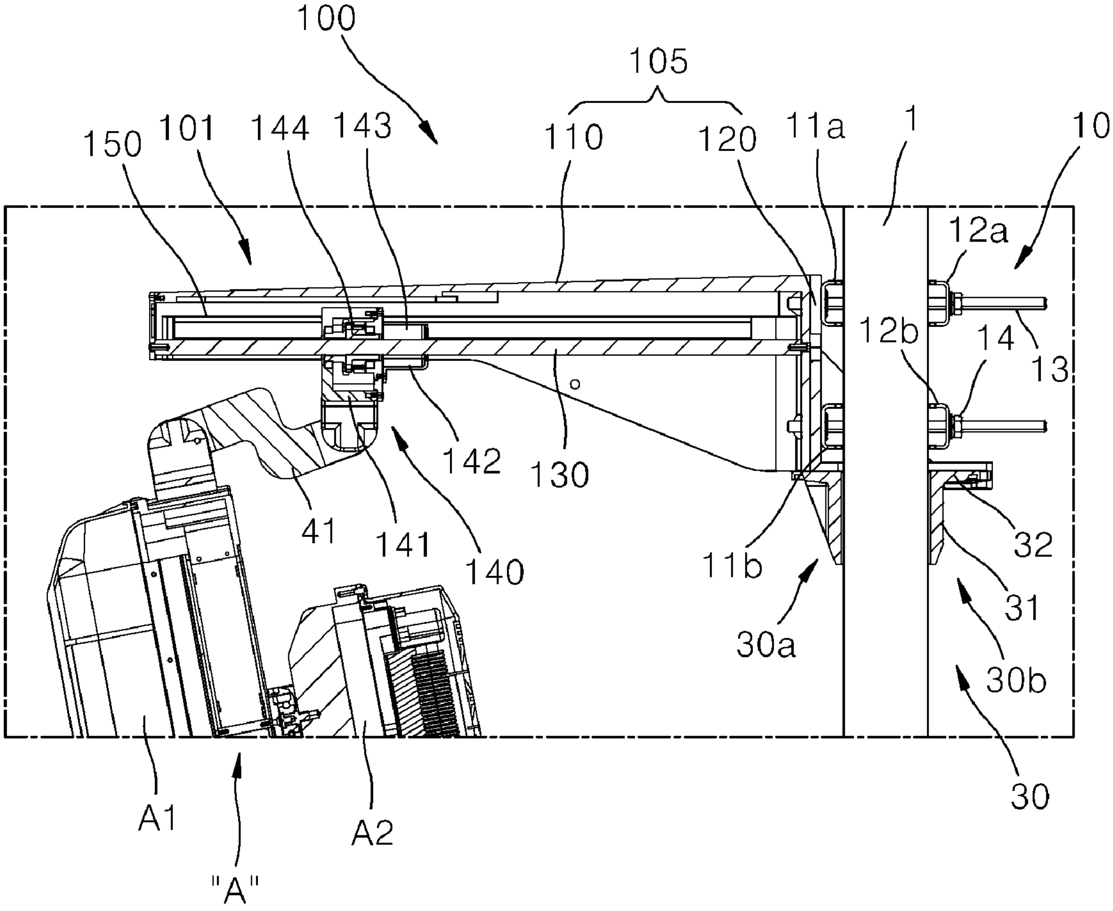
FIG. 5 is a side cross-sectional view illustrating a tilting unit in the configurations of FIGS. 1 and 2.
Figure 6:
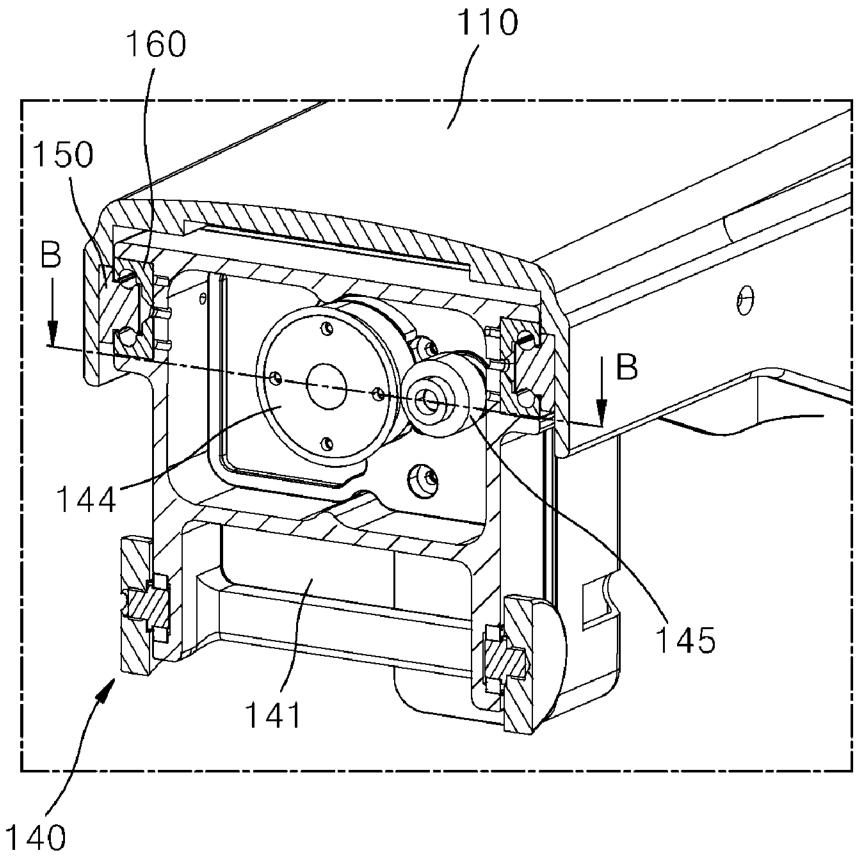
FIG. 6 is a cut-away perspective view taken along line A-A of FIG. 1.
Figure 7:
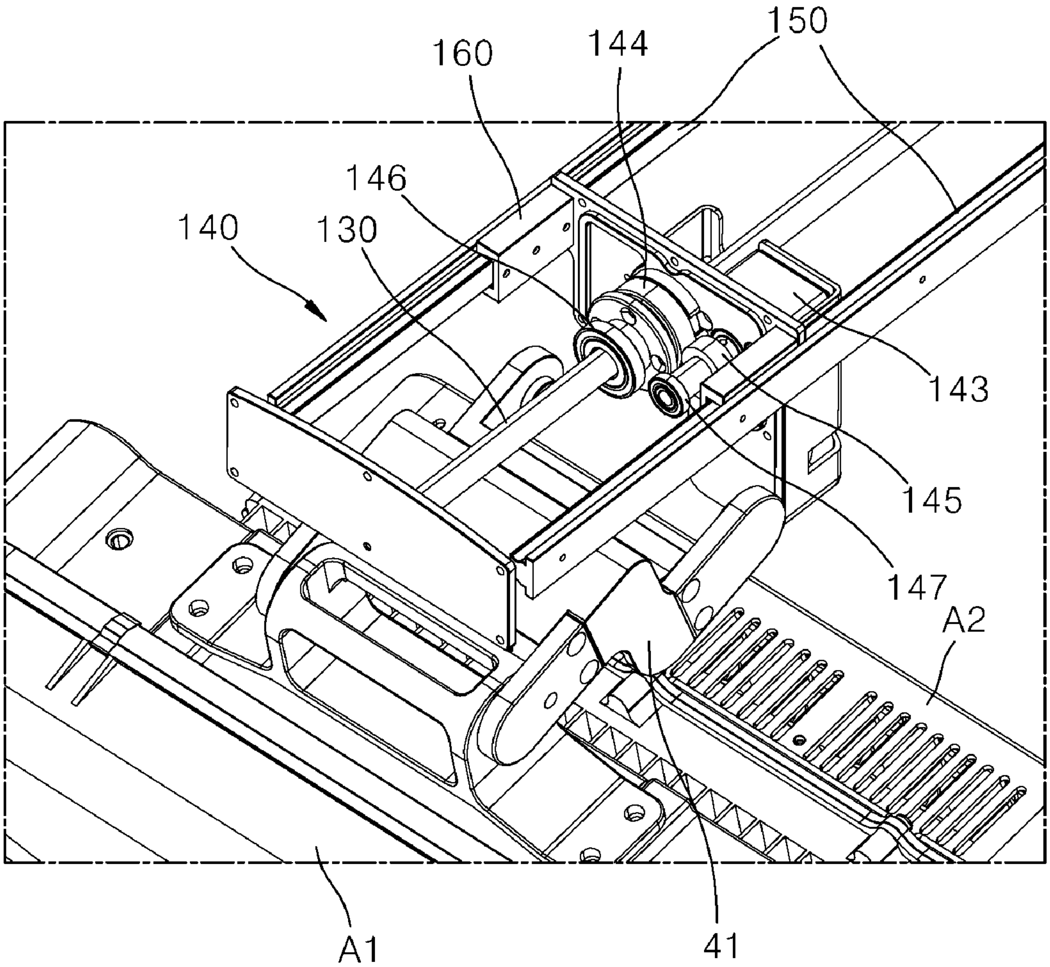
FIG. 7 is an internal perspective view illustrating the tilting unit in the configurations of FIGS. 1 and 2, with a guide housing removed.

FIG. 5 is a side cross-sectional view illustrating a tilting unit in the configurations of FIGS. 1 and 2, FIG. 6 is a cut-away perspective view taken along line A-A of FIG. 1, and FIG. 7 is an internal perspective view illustrating the tilting unit in the configurations of FIGS. 1 and 2, with a guide housing removed.

First, in order to help understanding of the base station antenna device according to the present disclosure, the configuration of the base station antenna device will be described in detail. The base station antenna device according to an embodiment of the present disclosure includes an antenna module A1 and a remote radio head (RRH) A2. The antenna module A1 described in this embodiment is a concept that refers to all antenna modules having at least one frequency band. In addition, the RRH A2 described in this embodiment refers to a device that is connected to an antenna for each frequency band provided to the antenna module A1 to perform transmission/reception between the antenna and a base station. The RRH A2 refers to a relay device that functions to receive a weakened signal and amplify or retransmit it, to normalize a distorted waveform, to readjust timing, between the base station of a mobile communication system and a mobile communication terminal, or the like.

The base station antenna device according to an embodiment of the present disclosure, as illustrated in FIGS. 1 to 4, includes an antenna module A1 vertically provided to have a separation space S spaced a predetermined distance forward with respect to a support pole 1 so as to be tiltable at a predetermined angle, a remote radio head (RRH) A2 provided on the rear surface of the antenna module A1 so as to be positioned in the separation space S such that the RRH is slidably assembled in a detachable manner in a horizontal direction from a lateral side of the separation space S, and an adapter 200 having a push block 250 provided on a lower end portion of the RRH A2 so as to mediate the electrical signal connection and disconnection between the antenna module A1 and the RRH A2 by means of a pushing operation in the longitudinal direction.

A tilting unit 100 for simultaneously tilting the antenna module A1 and the RRH A2 may be provided at an upper end of the support pole 1. Here, the upper end of the antenna module A1 is pivotally connected to the tilting unit 100, and a lower end of the antenna module A1 is pivotally connected to a lower end of the support pole 1 corresponding to the lower portion of the tilting unit 100.

The tilting unit 100 is provided to extend a predetermined length outwards in the horizontal direction from the upper end of the support pole 1. The tilting unit has a tilting part 101, to which an upper end of the antenna module A1 is connected. The tilting part is provided to move in the horizontal direction along a guide arm section 105 so that the upper end of the antenna module A1 is moved according to the moved distance of the tilting part 101, thereby adjusting a tilting angle of the antenna module A1. As described above, since the upper end of the antenna module A1 can be pivot-tilted in the front-rear horizontal direction about a lower fixed tilting point of the antenna module, it is advantageous in easily controlling the directionality of an antenna beam.

More specifically, the tilting unit 100 includes the guide arm section 105 and the tilting part 101. The guide aim section 105 serves to guide the movement of the tilting part 101, which is moved and guided along the guide arm section 105, serving to adjust the tilting angle of the antenna module A1.

As illustrated in FIGS. 5 to 7, the guide arm section 105 may horizontally extend toward one side orthogonal to the support pole 1 arranged vertically. The support pole 1 may be formed in a substantially hollow cylindrical shape.

In one embodiment of the present disclosure, the support pole 1 will be illustrated as being vertically arranged, as illustrated in FIGS. 1 and 2. However, although not illustrated in the drawings, it is natural that the support pole 1 may be horizontally disposed on a wall surface of a house. Therefore, as used in an embodiment of the present disclosure, the orientation-related terms will be described based on the vertically arranged support pole 1 regardless of the actual installation orientation of the support pole 1.

As illustrated in FIG. 5, the guide arm section 105 serves to guide the movement of the tilting part 101 while limiting the moving distance of the tilting part 101.

More specifically, as illustrated in FIG. 5, the guide arm section 105 may include a housing connector 120 that mediates the connection to the support pole 1, and a guide housing 110 that is connected to the housing connector 120 and horizontally extends in a direction perpendicular to the support q 1.

Here, the guide housing 110 may be formed to have a vertical cross section of a ‘C’ shape with an open lower side. This is for preventing interference with the movement of an upper pivot link 41 mediating the connection with the upper end of the antenna module A1, and the tilting part 101.

As illustrated in FIGS. 5 to 7, the tilting part 101 is disposed in the guide arm section 105 to allow the upper end of the antenna module A1 to pivotally move in the horizontal direction in the guide arm section 105 about a fixed pivot point at the lower end of the antenna module A1, thereby serving to adjust the tilting angle with respect to the support pole 1.

In more detail, as illustrated in FIG. 4, the antenna module A1 may be pivotally hinge-connected to the tilting part 101 by means of the upper hinge link 41 provided at the upper end thereof, and to the support pole 1 by means of a lower hinge link 42 provided at the lower end thereof.

Here, as illustrated in FIG. 4, the support pole 1 may be provided with an upper coupling clamp 10 and a seating clamp 30 that mediate the coupling of the guide arm section 105 provided to tilt the upper end of the antenna module A1, and a lower coupling clamp 20 that mediates the coupling of a pivot bracket 45 provided to mediate the hinge coupling with the lower hinge link 42 connected to the lower end of the antenna module A1.

The upper hinge link 41 may be pivotally hinged so that both one end thereof coupled to the antenna module A1 and the other end coupled to the tilting part 101 are pivotally hinged relative to each other, and the lower hinge link 42 may be pivotally hinged so that one end thereof coupled to the antenna module A1 is directly screwed so as not to be pivotable, and the other end coupled to the pivot bracket 45 is pivotally hinged relative to each other. Accordingly, it can be defined that the hinge position of the antenna module A1 connected by the upper hinge link 41 varies according to the position of the tilting part 101 in the guide aim section 105, whereas the hinge position of the antenna module A1 connected by the lower hinge link 42 is relatively fixed.

On the other hand, as illustrated in FIGS. 5 to 7, the tilting part 101 extends lengthwise in the guide housing 110 of the guide arm section 105, and may include a screw bolt 130 having an external thread on an outer circumferential surface thereof, and a tilting drive 140 that is moved along the screw bolt 130 and is hinge-connected to the upper end of the antenna module A1 through the upper hinge link 41.

Here, although not illustrated in detail in the drawings, the external thread formed on the screw bolt 130 may have any one of a ball screw shape into which a ball of a predetermined size is inserted, and a trapezoidal shape that facilitates gear meshing.

The screw bolt 130 may be fixed to both ends of the interior of the guide housing 110 extending in the horizontal direction perpendicular to the support pole 1 by means of fixing screws (not shown), respectively.

As illustrated in FIGS. 5 to 7, the tilting drive 140 may include a drive housing 141 having an interior space therein, an electric drive motor 143 provided in a motor housing 142 coupled to the drive housing 141, a drive gear 145 rotatably interlocked with a rotary shaft of the drive motor 143 extending from the motor housing 142 toward the drive housing 141, the drive gear having gear teeth on a circumferential surface thereof, and a moving gear 144 having a central internal thread to be meshed with the screw bolt passing therethrough, and circumferential gear teeth to be meshed with the drive gear 145.

The drive housing 141 has the interior space that serves as an installation space in which the drive gear 145 and the moving gear 144 are installed, and one side thereof is connected to a pair of guide rails 150 (which is described later) fixed to the guide housing 110 and another side thereof is connected to the upper end of the antenna module A1 by means of the upper hinge link 41 so that as the drive motor 143 is driven, the upper end of the antenna module A1 is moved lengthwise (i.e., in the horizontal direction) under the guide housing 110 along the guide rail 140 to adjust the tilting angle.

The motor housing 142 may be provided to form a separate space on one side of the drive housing 141, and the drive motor 143 may be fixed in the motor housing 142 such that the drive motor has the rotary shaft spaced parallel to the screw bolt 130.

The rotary shaft of the drive motor 143 may extend from the interior of the motor housing 142 into and exposed to the interior of the drive housing 141, and the drive gear 145 may be provided so as to be coaxially interlocked with the rotary shaft of the drive motor 143.

Here, as illustrated in FIGS. 5 to 7, the tilting drive 140 may further include a drive bearing support 147 for rotationally supporting the drive gear 145 with respect to the drive housing 141, and a moving bearing support 146 for rotationally supporting the moving gear 144 with respect to the drive housing 141.

The drive bearing support 147 and the moving bearing support 146 respectively serve to rotationally support the drive gear 145 and the moving gear 144, which are rotatably provided in the drive housing 141, with respect to the drive housing 141. Each of the drive bearing support 147 and the moving bearing support 146 has the configuration type in which a plurality of bearing balls is interposed between a stationary inner ring and a rotatable outer ring to reduce friction between the inner ring and the outer ring. Here, the inner ring may be stationary with respect to the drive housing 141, and the outer ring may be provided so as to rotate together with the drive gear 145 and the moving gear 144 in an interlocked manner.

Meanwhile, as illustrated in FIGS. 5 to 7, the tilting drive 140 may further include a pair of tilting guide rails 150 that is disposed on both sides in the width direction of the guide arm section 105, respectively, to extend in the longitudinal direction of the guide arm section 105, and a pair of moving guide blocks 160 that is fixed to the outside of the drive housing 141 so as to be assembled onto the pair of tilting guide rails 150, respectively, to mediate the coupling of the drive housing 141.

More specifically, the pair of tilting guide rails 150 may be horizontally fixed to both sides, respectively, in the width direction of the guide housing 110 horizontally extending in the longitudinal direction, so as to extend in the longitudinal direction.

In addition, the pair of moving guide blocks 160 may have a 'C'-shaped vertical cross-sectional shape so as to be engaged with the pair of tilting guide rails 150 while enclosing portions of the outer surfaces of the pair of tilting guide rails 150, and may be fixed to both sides of the outer surface of the drive housing 141, respectively.

Figure 8:
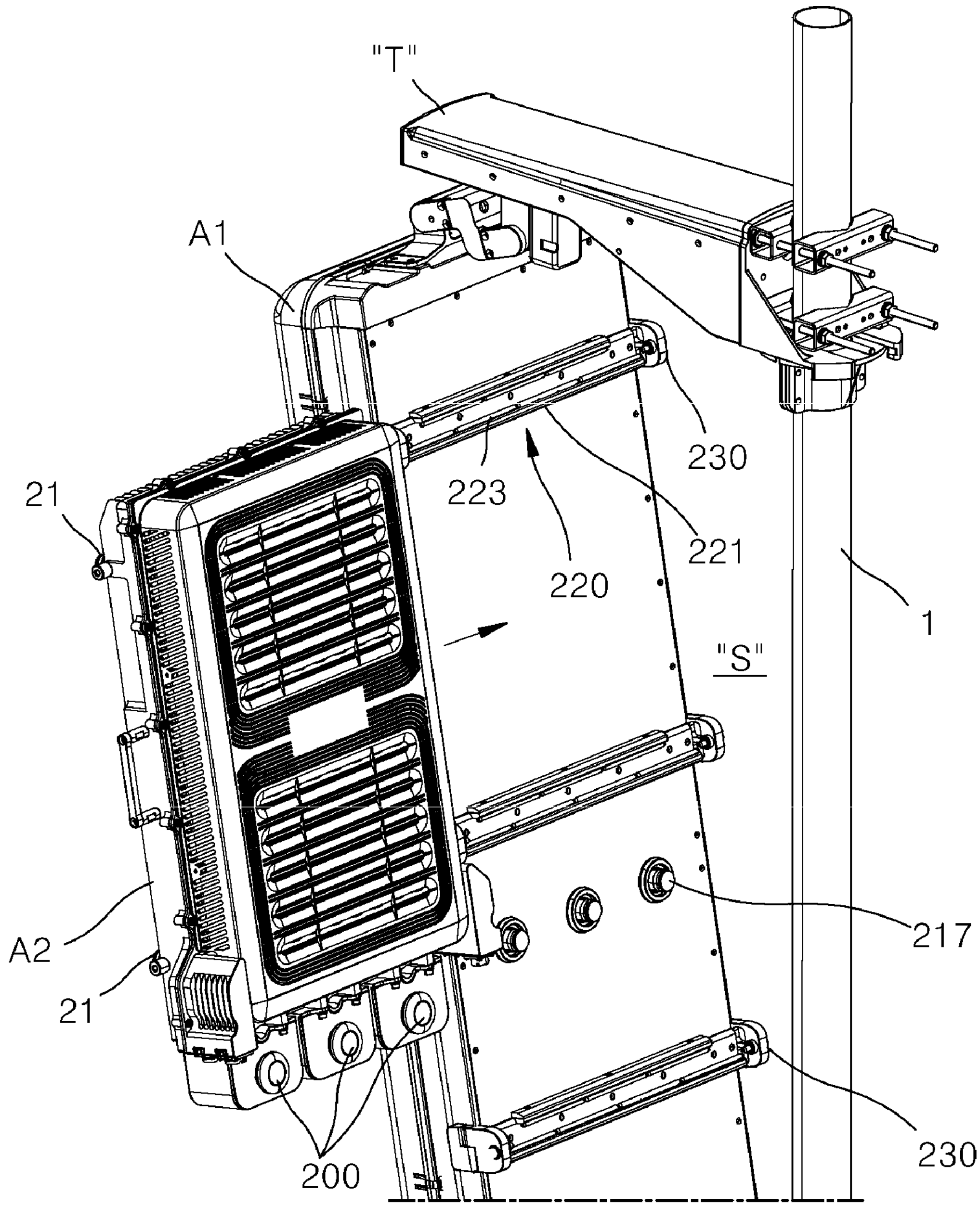
FIG. 8 is an exploded perspective view illustrating the assembly between the antenna module and a remote radio head (RRH) in the configuration of FIG. 2.
Figure 9:
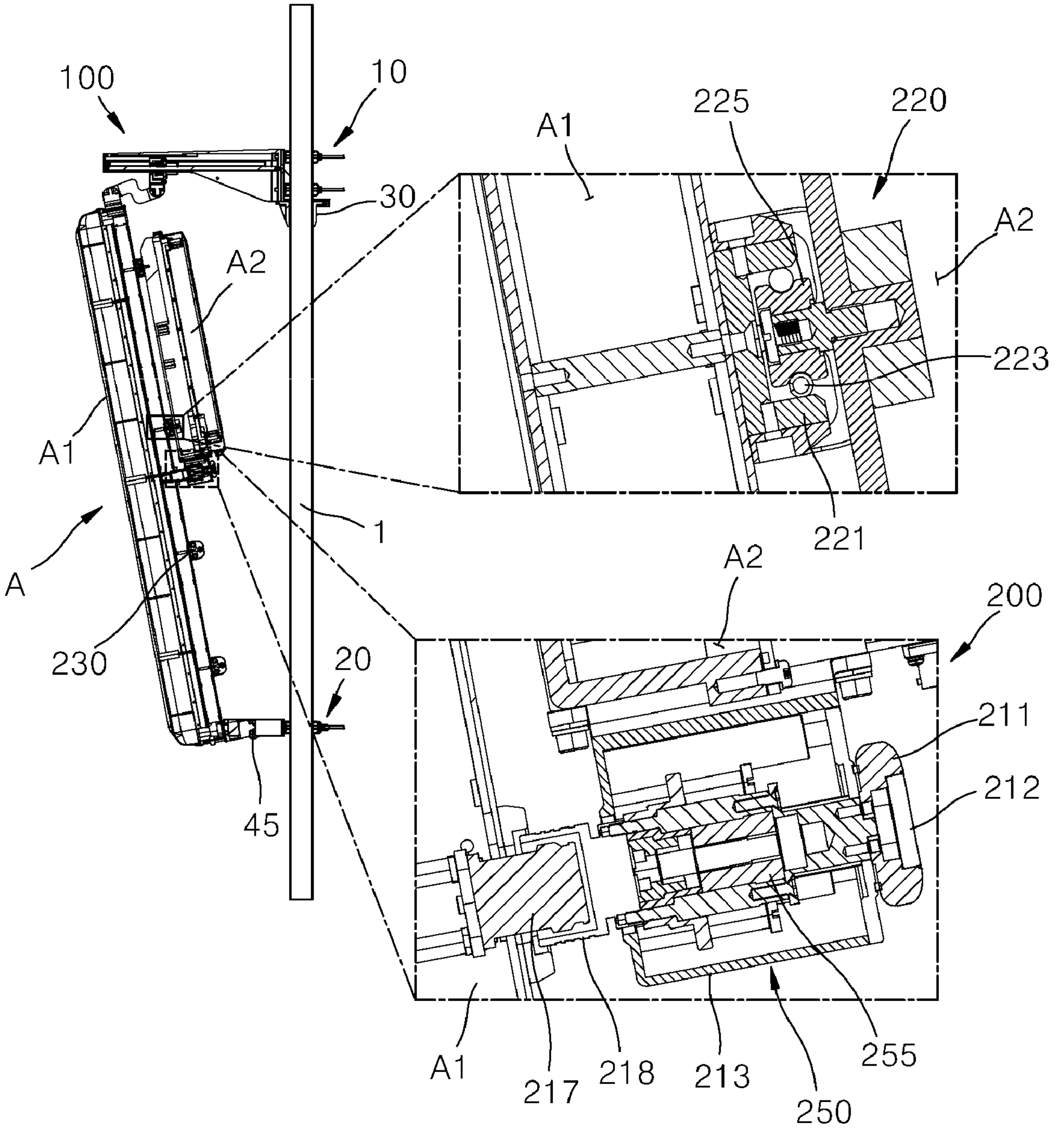
FIG. 9 is a partially enlarged cross-sectional view illustrating the base station antenna device according to the present disclosure.
Figure 10:
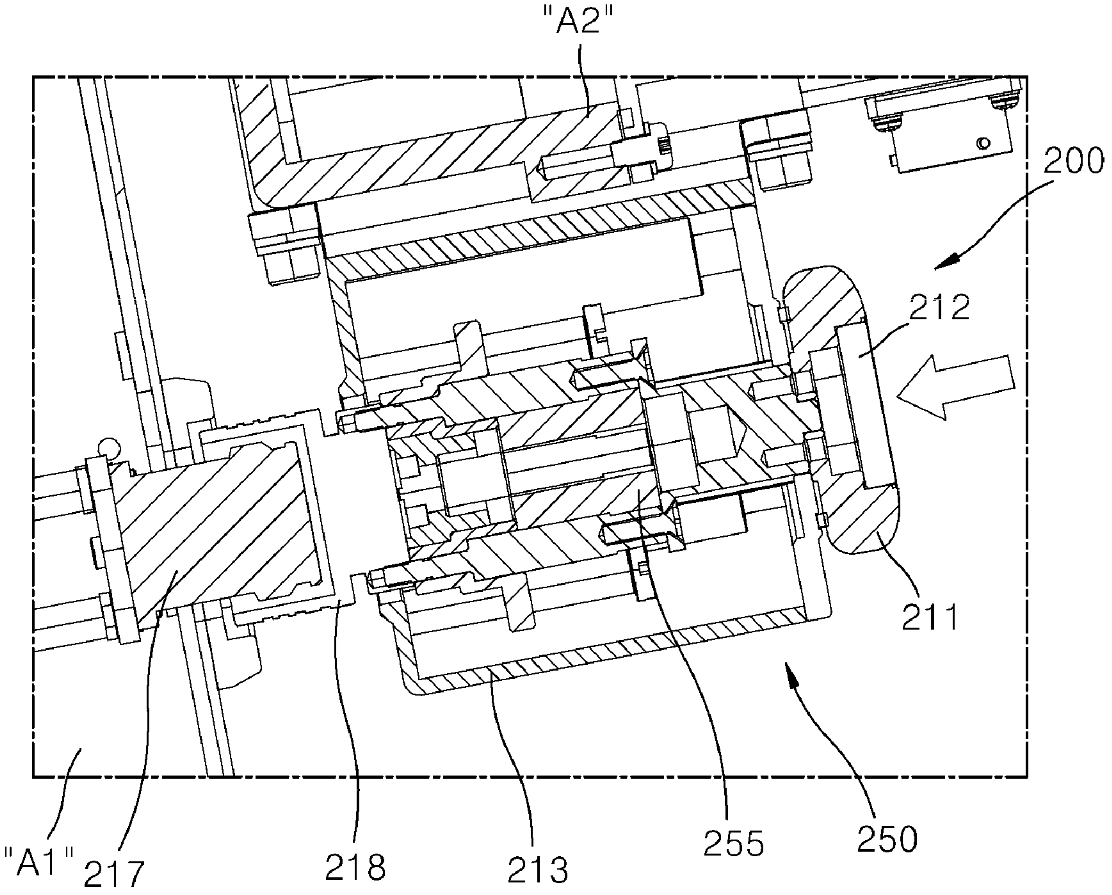
FIG. 10 is a cross-sectional view illustrating an adapter in the cross-sectional view of FIG. 9.

FIG. 8 is an exploded perspective view illustrating the assembly between the antenna module and a remote radio head (RRH) in the configuration of FIG. 2, FIG. 9 is a partially enlarged cross-sectional view illustrating the base station antenna device according to the present disclosure, and FIG. 10 is a cross-sectional view illustrating an adapter in the cross-sectional view of FIG. 9.

The antenna module A1 may be provided in the form of a vertically elongated and slim box, and may be installed parallel to the support pole 1 such that as illustrated in FIGS. 3 and 4, a separation space S is formed so as to be spaced a predetermined distance forward from the support pole 1.

Referring to FIG. 8, the RRH A2 may be installed in the separation space S between the antenna module A1 and the support pole 1. In more detail, the RRH A2 may be detachably coupled to the rear surface of the antenna module A1 in a slidable manner.

To this end, as illustrated in FIG. 9, at least one sliding assembly rail 220 extending in the horizontal direction may be disposed on the rear surface of the antenna module A1, and at least one sliding block 225 that is slidably coupled to the at least one sliding assembly rail 220 may be disposed on the front surface of the RRH A2 facing the rear surface of the antenna module A1.

Here, as illustrated in FIG. 9, the sliding assembly rail 220 includes a guide frame 221 disposed long in the horizontal directions on the rear surface of the antenna module A1, and guide rods 223 disposed long in the horizontal direction on the lower and upper sides of the interior of the guide frame 221. The guide rod 223 may be provided so that at least a portion of the outer circumferential surface thereof protrudes inward from the lower and upper ends of the guide frame 221.

Meanwhile, as illustrated in FIG. 9, the sliding block 225 may be provided in a wheel shape with a concave sliding groove formed on the outer circumferential surface thereof. With the operation that the guide rod 223 of the sliding assembly rail 220 is inserted into and coupled to the groove of the sliding block 225, the horizontal sliding motion of the RRH A2 with respect to the antenna module A1 may be guided.

In addition, as illustrated in FIG. 1, at least one fixing bracket 230 may be provided on the lateral side of the antenna module A1 so as to protrude from the left end and/or right end of the at least one sliding assembly rail 220.

Here, as illustrated in FIG. 1, at least one fixing bracket 230 may include a fixing block 231 coupled to the antenna module A1, and a pivot block 233 provided pivotally with respect to the fixing block 231, and is detachably fixed to the left or right side of the RRH A2. The pivot block 233 is provided to pivot outwards at least 90 degrees with respect to the fixed block 231, so that when the RRH A2 is horizontally moved toward and coupled to the sliding assembly rail 220 with respect to the antenna module A1, one side of the sliding assembly rail 220 may be opened.

That is, the pivot block 233 of the at least one fixing bracket 230 may maintain a pivoted state outwards with respect to the fixing block 231 fixed to the antenna module A1 for the sliding coupling before the sliding coupling of the RRH A2 with respect to the rear surface of the antenna module A1, and may be bolt-coupled or screw-coupled to the lateral side of RRH after the sliding coupling of the RRH A2 with respect to the rear surface of the antenna module A1, thereby preventing the horizontal decoupling of the RRH A2.

On the other hand, as illustrated in FIGS. 8 to 10, an adapter 200 of the base station antenna device according to an embodiment of the present disclosure may be provided such that a plurality of push blocks 250 is provided so as to be spaced apart a predetermined distance in the horizontal direction at the lower end of the RRH A2. In an embodiment of the present disclosure, although in the adapter 200, three push blocks 250 are spaced apart a predetermined distance in the horizontal direction at the lower end of the RRH A2, the present disclosure is not limited thereto.

The adapter 200 configured as described above serves to simultaneously establish an electrical connection and a physical locking-connection with a fixed connector 217 provided on the rear surface of the antenna module A1.

More specifically, as illustrated in FIGS. 9 and 10, the push block 250 in the configuration of the adapter 200 may include a locking connector 218 to allow for electrical connection and physical locking-connection with the fixed connector 217 by the pushing movement toward the antenna module A1 and for electrical disconnection and physical locking-disconnection from the fixed connector 217 by the pulling movement opposite to the antenna module A1.

As illustrated in FIG. 10, the push block 250 may include a push knob 211 provided so that a user can push or pull by hand, and a push indicator 212 on which a character or sign shape is printed on the outer surface of the push knob 211 to indicate the usage method of the push knob 211.

The locking connector 218 may be positioned at a pulling position to release the interference with the fixed connector 217 before the sliding coupling of the RRH A2 with respect to the rear surface of the antenna module A1, and at a push position to surround the fixed connector 217 after the sliding coupling of the RRH A2 with respect to the rear surface of the antenna module A1.

To this end, the push block 250 may further include a guide housing 213 having a space opened in a direction of the pushing movement and pulling movement, a moving block 255 provided to move along the guide housing 213, and the aforementioned locking connector 218 connected to the end of moving block 255.

Here, the end of the fixed connector 217 and the locking connector 218 are provided in a male-female connection by the pushing operation of the push block 250, so that the male-female connection is continuously maintained unless a separate external decoupling force is provided, thereby allowing the electrical connection between the antenna module A1 and the RRH A2 not to be arbitrarily released.

On the other hand, as described above, the electrical connection and the physical locking-connection between the antenna module A1 and the RRH A2 using the adapter 200 may be performed more easily after the upper end of the antenna module A1 is tilted forward at a predetermined angle by the tilting unit 100 so that the separation space S between the support pole 1 and the assembled antenna module A1 and RRH A2 varies more widely.

However, in the base station antenna device according to an embodiment of the present disclosure, the tilting operation is not necessarily performed in advance by the tilting unit 100 in that even in a limited separation space S between the antenna module A1 and the support pole 1, the RRH A2 is slidably moved and detachably coupled to the rear surface of the antenna module A1 in the horizontal direction from the lateral side of the antenna module.

In the foregoing, embodiments of the base station antenna device and the adapter according to the present disclosure have been described in detail with reference to the accompanying drawings. However, the embodiments of the present disclosure are not necessarily limited to the above-described embodiments, and it will be natural that various modifications and implementations within an equivalent scope are possible by those skilled in the art to which the present disclosure pertains. Therefore, the true scope of the present disclosure will be defined by the claims to be described later.

INDUSTRIAL APPLICABILITY

The present disclosure is to provide a base station antenna device capable of: minimizing the number of parts used to install an antenna module and a remote radio head (RRH) on a support while promoting the common use of the parts; minimizing the installation time and cost of the base station antenna device; and providing convenience in maintenance and repair, and an adapter thereof.

The invention claimed is:

1. A base station antenna device comprising:

an antenna module vertically provided to have a separation space spaced a predetermined distance forward with respect to a support pole so as to be tiltable at a predetermined angle;

a remote radio head (RRH) provided on a rear surface of the antenna module so as to be positioned in the separation space such that an entire body of the RRH is laterally inserted and slidably assembled in a detachable manner in a horizontal direction from a lateral side of the separation space; and an adapter having a push block provided on a lower end portion of the RRH so as to mediate the electrical signal connection and disconnection between the antenna module and the RRH by means of a pushing operation in a longitudinal direction.

2. The base station antenna device according to claim 1, wherein an upper end of the antenna module is connected to a tilting unit, which is connected to the support pole and provided to extend a predetermined length in a direction orthogonal to the horizontal direction, so as to be tiltable in the front and rear directions on the basis of a fixed tilting point of a lower end of the antenna module.

3. The base station antenna device according to claim 2, wherein the separation space is changed by a tilting operation of the antenna module tilted by the tilting unit.

4. The base station antenna device according to claim 1, wherein a plurality of adapters is provided at the lower end of the RRH so as to be spaced apart a predetermined distance in the horizontal direction.

5. The base station antenna device according to claim 1, wherein the antenna module is provided with a fixed connector connected to the push block.

6. The base station antenna device according to claim 5, wherein the push block includes a locking connector to allow for electrical connection and physical locking-connection with the fixed connector by the pushing movement toward the antenna module and for electrical disconnection and physical locking-disconnection from the fixed connector by the pulling movement opposite to the antenna module.

7. The base station antenna device according to claim 6, wherein the locking connector is positioned at a pulling position to release the interference with the fixed connector before the sliding coupling of the RRH with respect to the rear surface of the antenna module, and at a push position to surround the fixed connector after the sliding coupling of the RRH with respect to the rear surface of the antenna module.

8. The base station antenna device according to claim 7, wherein the push block includes a guide housing having a space opened in a direction of the pushing movement and pulling movement, a moving block provided to move along the guide housing, and the locking connector connected to an end of moving block.

9. A base station antenna device comprising:

an antenna module vertically provided to have a separation space spaced a predetermined distance forward with respect to a support pole so as to be tiltable at a predetermined angle;

a remote radio head (RRH) provided on a rear surface of the antenna module so as to be positioned in the separation space such that the RRH is slidably assembled in a detachable manner in a horizontal direction from a lateral side of the separation space; and an adapter having a push block provided on a lower end portion of the RRH so as to mediate the electrical signal connection and disconnection between the antenna module and the RRH by means of a pushing operation in the longitudinal direction, wherein at least one sliding assembly rail is arranged, extending lengthways in the horizontal direction, on the rear surface of the antenna module, and at least one sliding block is arranged on a front surface of the RRH opposite to the rear surface of the antenna module so as to be slidably assembled onto the at least one sliding assembly rail in a detachable manner.

10. The base station antenna device according to claim 9, wherein the sliding block is provided in the shape of a wheel with a concave sliding groove formed on an outer circumferential surface thereof, wherein a guide rod extending lengthways in the horizontal direction in the sliding assembly rail is inserted into and coupled to the sliding groove.

11. The base station antenna device according to claim 9, wherein at least one fixing bracket is provided on a lateral side of the antenna module so as to protrude from the left end and right end of the at least one sliding assembly rail, and the left or right fixing bracket is detachably assembled onto the lateral side of the antenna module.

12. The base station antenna device according to claim 11, wherein the at least one fixing bracket includes a fixing block coupled to the antenna module, and a pivot block provided pivotally with respect to the fixing block and detachably fixed to the left or right side of the RRH.

* * * * *